United States Patent
Lim et al.

(10) Patent No.: US 7,978,650 B2
(45) Date of Patent: Jul. 12, 2011

(54) APPARATUS AND METHOD FOR SUPPORTING MULTICAST/BROADCAST SERVICE IN BROADBAND WIRELESS ACCESS SYSTEM

(75) Inventors: Geun-Hwi Lim, Seongnam-si (KR); Jun-Hyung Kim, Suwon-si (KR); Joon-Ho Park, Seongnam-si (KR); Yong Chang, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1201 days.

(21) Appl. No.: 11/582,688

(22) Filed: Oct. 17, 2006

(65) Prior Publication Data

US 2007/0086380 A1 Apr. 19, 2007

(30) Foreign Application Priority Data

Oct. 19, 2005 (KR) .................. 10-2005-0098873
Dec. 16, 2005 (KR) .................. 10-2005-0124823

(51) Int. Cl.
*H04W 4/00* (2009.01)
(52) U.S. Cl. ......... 370/329; 370/350; 455/509; 455/502
(58) Field of Classification Search .......... 370/329, 370/319, 321, 337, 347, 442, 230, 310, 312, 370/328, 331, 338, 342, 343, 345, 389, 391, 370/395.2, 432, 535; 455/69, 414.3, 422.1, 455/436–444, 452.1, 517
See application file for complete search history.

(56) References Cited

U.S. PATENT DOCUMENTS

| | | | |
|---|---|---|---|
| 6,108,382 A * | 8/2000 | Gringeri et al. | 375/240.01 |
| 6,643,321 B1 * | 11/2003 | Genossar et al. | 375/219 |
| 6,690,679 B1 * | 2/2004 | Turunen et al. | 370/469 |
| 7,260,079 B1 * | 8/2007 | Chapman et al. | 370/338 |
| 7,406,299 B1 * | 7/2008 | Hudson | 455/103 |
| 2001/0038620 A1 * | 11/2001 | Stanwood et al. | 370/336 |
| 2001/0055336 A1 * | 12/2001 | Krause et al. | 375/240.11 |
| 2002/0026502 A1 * | 2/2002 | Phillips et al. | 709/219 |
| 2002/0181438 A1 * | 12/2002 | McGibney | 370/350 |
| 2004/0028591 A1 | 2/2004 | Coulson et al. | |
| 2004/0029591 A1 | 2/2004 | Chapman et al. | |
| 2004/0136440 A1 * | 7/2004 | Miyata et al. | 375/130 |
| 2004/0213193 A1 * | 10/2004 | Longoni | 370/342 |
| 2004/0248583 A1 * | 12/2004 | Satt et al. | 455/452.2 |
| 2004/0267948 A1 * | 12/2004 | Oliver et al. | 709/230 |
| 2005/0207412 A1 * | 9/2005 | Kawashima et al. | 370/389 |
| 2005/0210174 A1 * | 9/2005 | Hofmann et al. | 710/263 |
| 2005/0220050 A1 * | 10/2005 | Uchida | 370/329 |

(Continued)

FOREIGN PATENT DOCUMENTS

EP 1 152 318 4/2001
KR 1020020047758 6/2002

*Primary Examiner* — Kamran Afshar
*Assistant Examiner* — Marisol Fahnert
(74) *Attorney, Agent, or Firm* — The Farrell Law Firm, P.C.

(57) ABSTRACT

An apparatus and a method for processing media data so that an MBS is supported in a BWA communication system. A traffic processing method supports an MBS in a broadband wireless access communication system having a number of base stations and at least one contents server for transmitting various media traffics to the base stations. The method includes reserving a resource for MBS burst assignment with regard to the base stations; requesting the contents server to provide a traffic to be transmitted to the base stations when the resource has been successfully reserved; shaping a media traffic transmitted by the contents server; and transmitting the media traffic to the base stations.

29 Claims, 6 Drawing Sheets

U.S. PATENT DOCUMENTS

2005/0257254 A1* 11/2005 Hamada ............................ 726/5
2005/0288025 A1* 12/2005 Yoshida et al. ............... 455/442
2006/0239264 A1* 10/2006 Kang et al. .................... 370/390
2007/0211665 A1* 9/2007 Yoshida et al. ............... 370/331
2008/0037460 A1* 2/2008 Venkatachalam ............. 370/328
2009/0046637 A1* 2/2009 Kim et al. ..................... 370/329

* cited by examiner

APPARATUS AND METHOD FOR SUPPORTING MULTICAST/BROADCAST SERVICE IN BROADBAND WIRELESS ACCESS SYSTEM

PRIORITY

This application claims priority to an application filed with the Korean Intellectual Property Office on Oct. 19, 2005 and assigned Serial No. 2005-98873 and an application entitled the same filed with the Korean Intellectual Property Office on Dec. 16, 2005 and assigned Serial No. 2005-124823, the contents of which are incorporated herein by reference.

BACKGROUND OF THE INVENTION

1. Field of the Invention

The present invention relates to a BWA (Broadband Wireless Access) system, and more particularly to an apparatus and a method for providing an MS (Mobile Station) with an MBS (Multicast/Broadcast Service) in a BWA system.

2. Description of the Related Art

As generally known in the art, communication systems have been primarily developed for voice communication services, but they are also evolving to provide data services and various multimedia services. However, conventional communication systems, which are mainly directed to providing voice communication services, still have a narrow data transmission bandwidth and require high subscription fee. For these reasons, they cannot satisfy diversified user demands. Furthermore, in line with rapid development in the communication industry and ever-increasing demands on Internet services, it is important to provide communication systems capable of providing Internet services efficiently. As a result of these trends, BWA systems having a bandwidth large enough to both satisfy the increasing user demands and provide efficient Internet services have been proposed.

In addition to providing voice communication services, BWA systems also aim at supporting various data services both at low and high speeds and multimedia application services (e.g. high-quality moving pictures) in combination. BWA systems are based on wireless media using a broadband of 2 GHz, 5 GHz, 26 GHz, or 60 GHz and are able to access a PSTN (Public Switched Telephone Network), PSDN (Public Switched Data Network), Internet network, IMT-2000 (International Mobile Telecommunications-2000) network, and ATM (Asynchronous Transfer Mode) network in a mobile or stationary environment. In other words, BWA systems are wireless communication systems capable of supporting a channel transmission rate of at least 2 Mbps. BWA systems may be classified into broadband wireless local loops, broadband mobile access networks, and high-speed wireless LANs (Local Area Networks) according to the terminal's mobility (stationary or mobile), communication environment (indoor or outdoor), and channel transmission rate.

The standardization of wireless access schemes of BWA systems is being conducted by IEEE (Institute of Electrical and Electronics Engineers), which is one of the international standardization organizations, particularly by IEEE 802.16 standardization group. Currently, IEEE 802.16d and IEEE 802.16e standards are being established as so to provide stationary or mobile stations with wireless broadband Internet services. Particularly, extensive studies are being made to enable BWA systems, including wireless LAN communication systems and wireless MAN (Metropolitan Area Network) communication systems, to provide high-speed services while guaranteeing mobility and various QoS (Quality of Service). Representative examples thereof include IEEE 802.16d communication systems and IEEE 802.16e communication systems (hereinafter, referred to as IEEE 802.16d/e communication systems).

The IEEE 802.16d/e communication systems are obtained by applying an OFDM (Orthogonal Frequency Division Multiplexing) scheme and an OFDMA (Orthogonal Frequency Division Multiple Access) scheme to the wireless MAN communication systems so that their physical channels support broadband transmission networks. The IEEE 802.16d communication systems do not consider the mobility of SSs (Subscriber Stations), i.e. they assume that the SSs are currently stationary, but consider a single cell structure. In contrast, the IEEE 802.16e communication systems consider the mobility of the SSs. In this regard, SSs having mobility will hereinafter be referred to as MSs (Mobile Stations).

Compared with conventional communication systems for voice communication services, the IEEE 802.16d/e communication systems have a larger data transmission bandwidth. Therefore, they can transmit more data for a limited period of time and share all user channels for efficient channel utilization. Since the QoS is guaranteed, users are provided with various services of different qualities based on the characteristics of services. The IEEE 802.16e communication systems enable all users connected to a BS (Base Station) to share and use common channels, and the base station assigns usable channel sections to respective users for every upward and downward frame. Therefore, the base station must provide respective users with upward and downward access information so that they can divide and use channels for each frame.

To this end, the IEEE 802.16e communication systems divide channels into upward and downward channels and define information regarding each channel in terms of TLV (Type, Length, Value). The TLV is periodically transmitted to all users while being included in a DCD (Downlink Channel Descriptor) message and a UCD (Upward Channel Descriptor) message, so that corresponding MSs are informed of characteristics of the channels.

Meanwhile, the 802.16 communication systems can provide an MBS (Multicast/Broadcast Service) in one of two modes, i.e. a single-BS access mode and a multi-BS access mode, according to how MSs access the service.

In the single-BS access mode, each MS is provided with an MBS from a BS (e.g. serving BS), to which the MS has subscribed. In the multi-BS access mode, each MS is simultaneously provided with an MBS from at least two BSs, for example, both the serving BS and an adjacent BS, in a region where cells of the BSs overlap each other. The network construction of a system for providing an MBS will now be described briefly with reference to FIGS. 1 and 2.

FIGS. 1 and 2 show the construction of a system for providing an MBS in an conventional BWA system. Particularly, FIG. 1 shows the network construction based on a single-BS access mode, and FIG. 2 shows that based on a multi-BS access mode. [PLEASE LABEL "PRIOR ART"]

Referring to FIGS. 1 and 2, the network construction for providing an MBS in a conventional BWA system is based on one of two modes, i.e. a single-BS access mode (FIG. 1) and a multi-BS access mode (FIG. 2), according to how MSs access the service, as mentioned above.

Particularly, according to the network construction shown in FIG. 1, MSs, e.g. first and second MSs 101 and 103, are provided with an MBS from a single BS, e.g. BS 110, to which they belong, in a single-BS mode. According to the network construction shown in FIG. 2, an MS, e.g. a second MS 203, is simultaneously provided with an MBS from two BSs, e.g. a first BS 210, to which it belongs, and an adjacent BS 230, i.e. a second BS 230, respectively, in a multi-BS access mode. FIG. 2 also shows a first MB 201 receiving an MBS from a single BS, i.e. the first BS 210, to which it belongs, and a third MB 205 receiving an MBS from a single BS, i.e. the second BS 230, to which it belongs, in a single-BS access mode.

As such, in the multi-BS access mode, the MBs do not need to subscribe to all BSs, e.g. the first and second BSs 210 and 230, which provide an MBS, in contrast to the single-BS access mode.

In particular, when an MS actually needs a service, it creates a connection for MBS between a corresponding BS and the MS through a service assignment procedure, such as DSA (Dynamic Service Assignment). In this case, the MS receives MBS contents identifier TLV encoding information so as to obtain MBS connection information.

Based on the MBS contents identifier TLV encoding information, the MS can identify the same multicast/broadcast service zone (hereinafter, referred to as MBS_ZONE) with reference to different CIDs (Connection IDs) or different SAs (Security Associations).

Particularly, the MBS_ZONE confirmed by CIDs and SAs refers to a zone having an effective MBS flow. Therefore, the BS broadcasts MBS_ZONE information to the MS via a DCD message, for example. In this regard, it can be said that the MBS_ZONE refers to a group of BSs using the same CID and SA so as to transmit contents.

Meanwhile, in order to provide an MS with an MBS in the multi-BS access mode, it is necessary to equalize the synchronization of information regarding media transmitted by a contents server in the MBS_ZONE, as well as the position of bursts assigned to frames transmitted by BSs. Generally, the fact that the characteristics of media transmitted by the contents server, e.g. characteristics of traffic, are very diversified makes it difficult to properly assign bursts to a number of BSs with regard to each traffic.

However, neither an apparatus nor a method for solving the above-mentioned problems occurring in the prior art has been proposed in the art. Therefore, it is an opportune time to provide a scheme for equalizing the synchronization of media information and the position of bursts so that BSs can efficiently provide MBs with an MBS in a BWA system, as well as a scheme for assigning bursts in accordance with various traffic characteristics.

SUMMARY OF THE INVENTION

Accordingly, the present invention solves the above-mentioned problems occurring in the prior art, and an object of the present invention is to provide an apparatus and a method for processing media traffic so that MSs are efficiently provided with an MBS in a BWA system.

Another object of the present invention is to provide an apparatus and a method for providing MBs with an MBS based on a multi-BS access mode in a BWA system.

Another object of the present invention is to provide an apparatus and a method for transmitting pieces of media information to a number of BSs within an MBS_ZONE in a BWA system after equalizing the synchronization of the information.

Another object of the present invention is to provide an apparatus and a method for assigning bursts in accordance with the characteristics of a number of media in a BWA system.

In order to accomplish this object, there is provided a traffic processing method for supporting an MBS (Multicast/Broadcast Service) in a broadband wireless access communication system having a number of base stations and at least one contents server for transmitting various media traffics to the base stations, the method including reserving a resource for MBS burst assignment with regard to the base stations; requesting the contents server to provide a traffic to be transmitted to the base stations when the resource has been successfully reserved; shaping a media traffic transmitted by the contents server; and transmitting the media traffic to the base stations.

In accordance with another aspect of the present invention, there is provided a method for supporting an MBS in a broadband wireless access communication system having a mobile station, a contents server for providing various types of media information, a number of base stations, and a controller for transmitting the media information to the base stations, the method including reserving a resource for MBS burst assignment with regard to all base stations positioned in an identical MBS zone by the controller; transmitting information regarding possibility of assignment to the controller in response to a request for MBS burst assignment by the base stations positioned in the identical MBS zone, the information having been designated by a flag; requesting the contents server to provide media to be transmitted to the base stations by the controller when MBS burst assignment is possible; receiving a media stream from the contents server in response to a request of the media, shaping the media stream, and transmitting the media stream to the base stations in the identical MBS zone; transmitting the media stream to the mobile station by the base stations, the media stream having been shaped; and receiving the media stream transmitted to the base stations in the identical MBS zone, combining each received media stream, and providing a user with the media stream.

In accordance with another aspect of the present invention, there is provided a traffic processing apparatus for supporting an MBS in a broadband wireless access communication system having at least one contents server for transmitting various media traffics, the apparatus including an MBS controller for reserving a resource for MBS burst assignment, requesting the contents server to provide a traffic to be transmitted, shaping the traffic provided by the contents server, and providing the traffic.

In accordance with another aspect of the present invention, there is provided a system for supporting an MBS in a broadband wireless access communication system having a number of base stations and at least one contents server for transmitting various media streams to the base stations, the system including an MBS controller for reserving a resource for MBS burst assignment with regard to the base stations, requesting the contents server to provide media to be transmitted to the base stations, receiving a corresponding media stream, converting the media stream into an MBS media stream through shaping processing, and transmitting the MBS media stream to the base stations; a number of base stations for providing burst information requested by the MBS controller, notifying possibility of resource assignment for MBS burst assignment in response to a request of the MBS controller by means of a flag setup, and transmitting the MBS media stream to a mobile station; and a mobile station for receiving MBS media data from the base stations, combining the MBS media data, and providing a user with the MBS media data.

In accordance with another aspect of the present invention, there is provided a traffic processing apparatus for supporting an MBS in a broadband wireless access communication system having at least one contents server for transmitting various media traffics, the apparatus including an MBS controller for reserving a resource for MBS burst assignment, requesting the contents server to provide a traffic to be transmitted, shaping and multiplexing the traffic provided by the contents server, providing the traffic, and creating a medium access control packet data unit.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description, detailed description of known functions and configurations incorporated herein is omitted to avoid making the subject matter of the present invention unclear.

The present invention is directed to an apparatus and a method for providing MSs with an MBS by BSs in a BWA system. Particularly, the present invention provides an apparatus and a method for transmitting media information from a number of contents servers to a number of BSs within an MBS_ZONE in a BWA system after equalizing the synchronization of the information. To this end, the present invention provides an MBS controller for equalizing the synchronization and a method for processing the traffic of the MBS controller.

In this regard, the present invention defines the function of an MBS controller for providing an MBS in a BWA system so that, in order to provide an efficient service, the traffic of a number of contents servers is processed through the functions of traffic shaping and multiplexing.

According to the present invention, an MBS controller for controlling BSs in an MBS_ZONE controls a traffic pattern, which is to be transmitted, in a uniform manner through traffic multiplexing and shaping. In addition, the MBS controller transmits a reservation message for burst assignment to a number of BSs so as to equalize the synchronization of media information.

Although it will be assumed in the following description that the present invention is applied to a BWA system, particularly an IEEE 802.16 system, the present invention is not limited to that and is applicable to any type of communication system for providing an MBS. Preferred embodiments of the present invention for providing an MBS will now be described with reference to the accompanying drawings.

Figure 1:
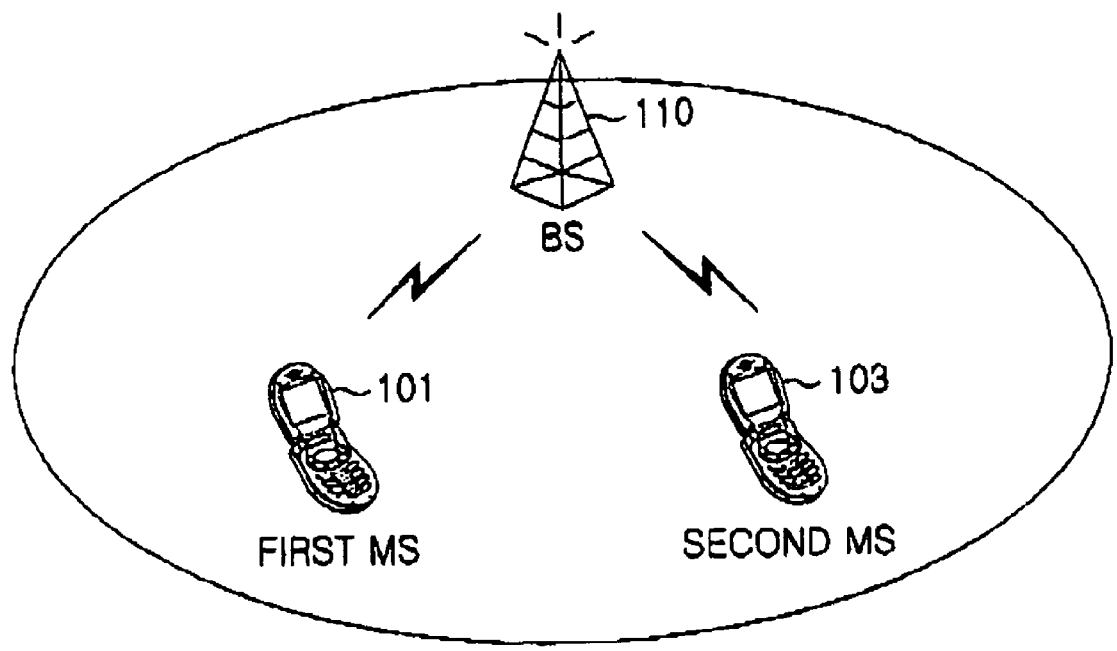
FIG. 1 shows the network construction of a system for providing an MBS in a conventional BWA system to prior art.
Figure 2:
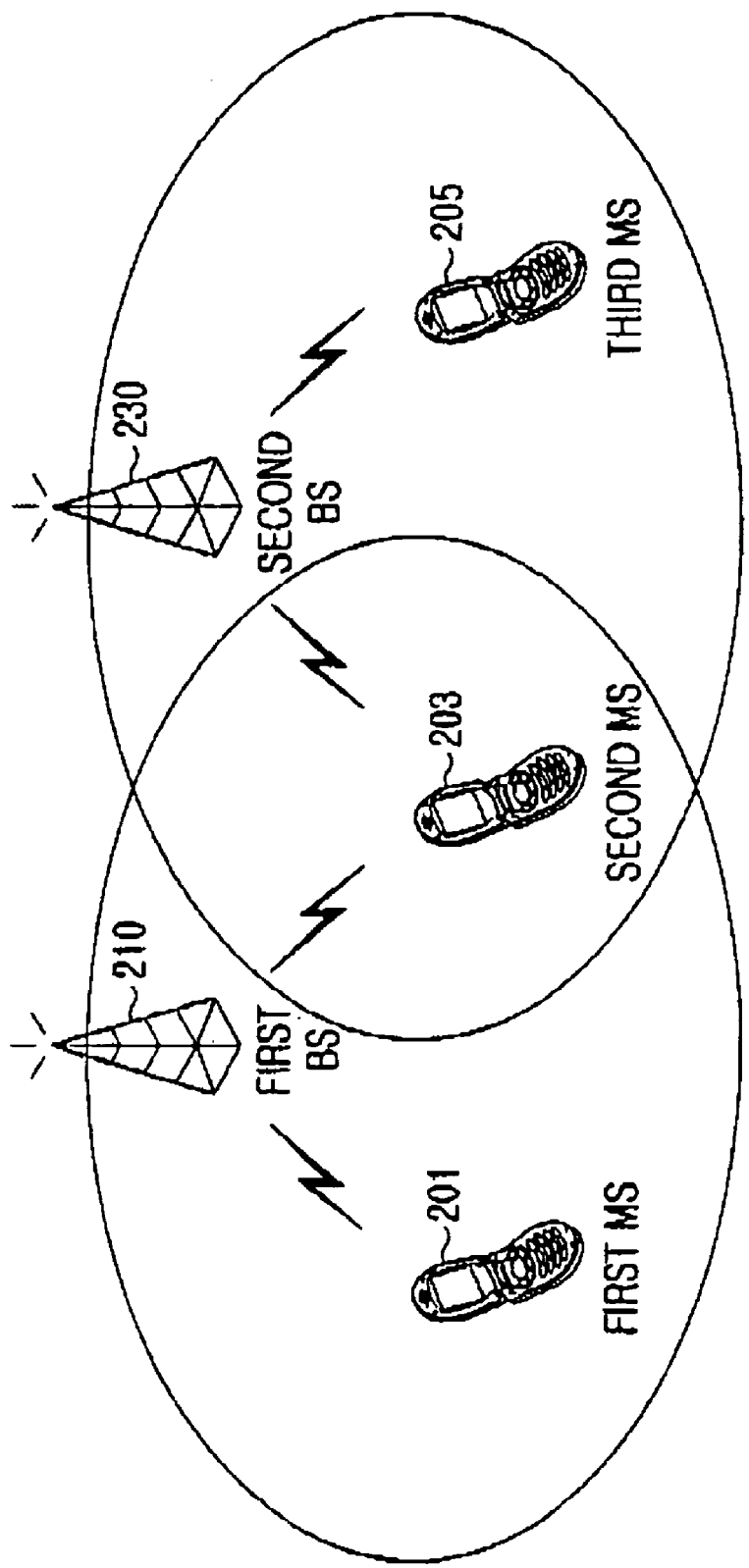
FIG. 2 shows the network construction of a system for providing an MBS in a conventional BWA system to prior art.
Figure 3:
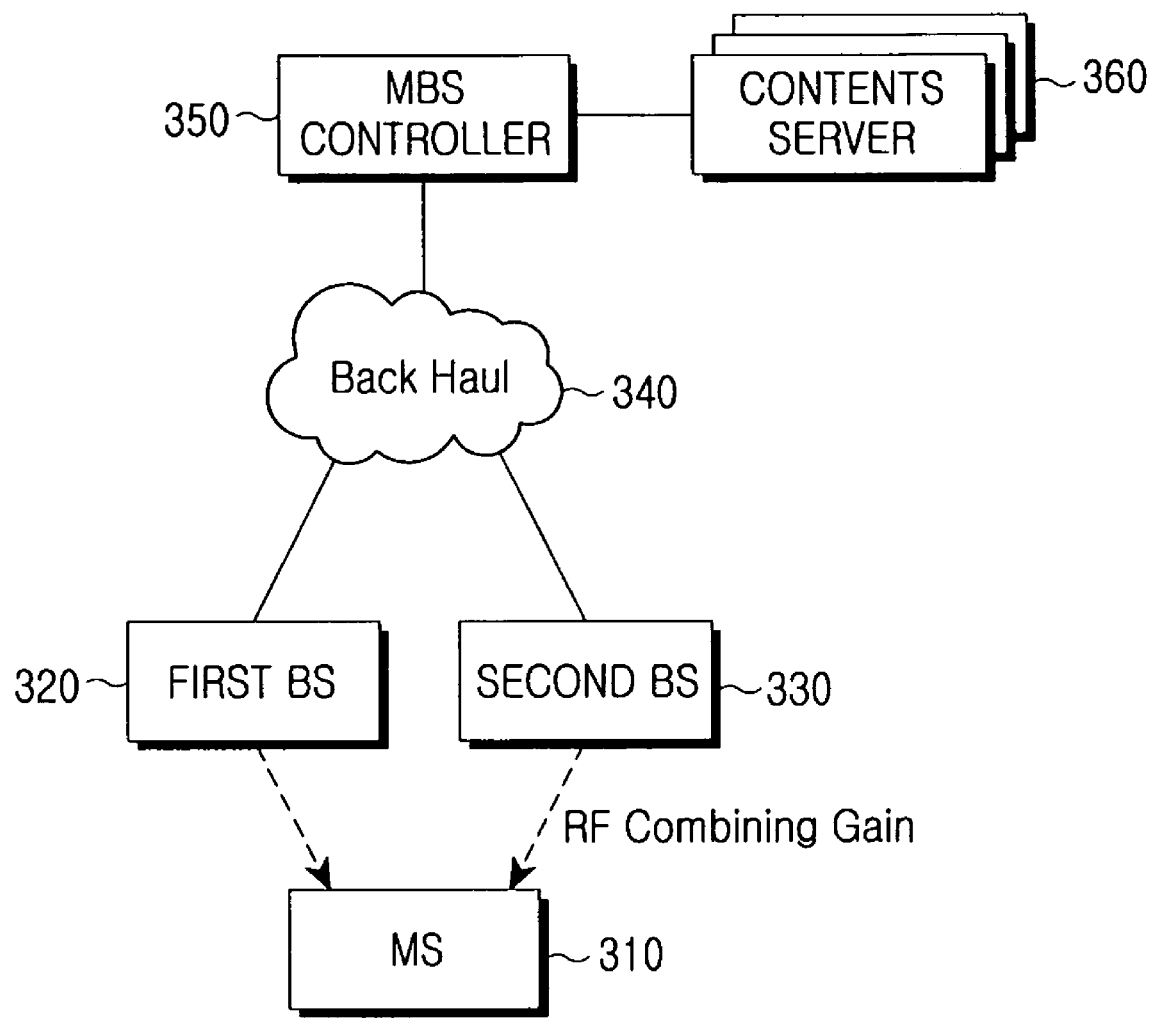
FIG. 3 shows the network construction of a system for providing an MBS in a BWA system according to the present invention.

FIG. 3 briefly shows the network construction of a system for providing an MBS in a BWA system according to the present invention.

As shown in FIG. 3, a system for providing an MBS according to the present invention includes an MS 310, a number of BSs, e.g. first and second BSs 320 and 330, a backhaul 340, an MBS controller 350, and a number of contents servers 360.

Referring to FIG. 3, first and second BSs 320 and 330 belong to the same MBS_ZONE. MBS controller 350 controls first and second BSs 320 and 330 via backhaul 340. As used herein, backhaul 340 generally refers to a network through which data can be transmitted to a distributed location, or simply a backbone network.

Contents servers 360 provide various types of media information, which is transmitted to a BS, e.g. the first or second BS 320 or 330, via the MBS controller 350.

MS 310 is simultaneously provided with an MBS from the BSs, particularly the first and second BSs 320 and 330, in a multi-BS access mode.

A method for providing an MBS according to the present invention, which is based on the above-mentioned construction, will now be described.

MS 310 simultaneously receives a frame from the first and second BSs 320 and 330. According to the present invention, MS 310 can acquire a gain resulting from RF (Radio Frequency) combining. To this end, the first and second BSs 320 and 330 must perform synchronization for the MBS in advance.

Parameters used for the synchronization are given in Table 1 below.

TABLE 1

| Static Parameters | Dynamic Parameters |
| --- | --- |
| Frequency assignment information (Frequency band) | Burst assignment information |
| Time information | Frame information |
| Sub-channelizing information | Symbol |
| Permutation information | Sub-channel information |

As given in Table 1, parameters used for synchronization may be classified into static and dynamic parameters. The static parameters include frequency assignment information, time information, sub-channelizing information, and permutation information. The dynamic parameters include burst assignment information, frame information, symbol, and sub-channel information.

In order to equalize the synchronization between BSs, e.g. the first and second BSs 320 and 330 shown in FIG. 3, the present invention implements the information as given in Table 1. Alternatively, the system includes an MBS controller 350 for controlling respective BSs 320 and 330.

According to the present invention, the MBS controller 350 performs a number of functions so as to transmit various types of media information from contents servers 360 to respective BSs within the MBS_ZONE, e.g. first and second BSs 320 and 330. Particularly, MBS controller 350 collects information regarding media transmitted by contents servers 360, collects information regarding bursts of the BSs, processes the traffic, and reserves the assignment of MBS bursts of the BSs. Particularly, MBS controller 350 controls schedulers of the BSs so that the burst assignment information is synchronized. To this end, MBS controller 350 uses an MBS burst reservation method.

Detailed operations for providing an MBS according to the present invention will now be described. A procedure for providing MSs with a media stream via multicast by BSs will now be described with reference to FIG. 4.

Figure 4:
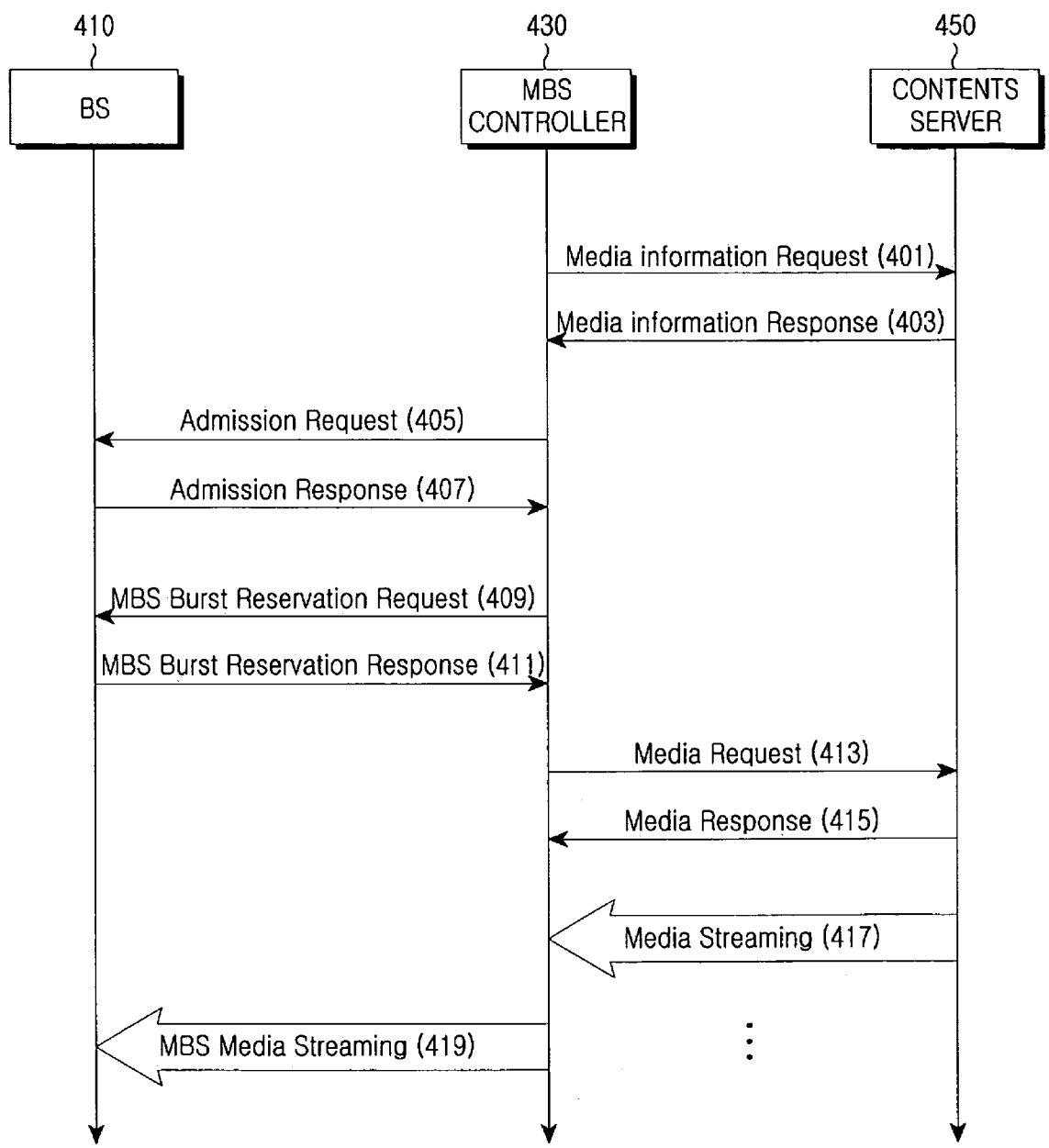
FIG. 4 shows steps for controlling a BS which provides an MBS in a BWA system according to the present invention.

FIG. 4 shows the steps for controlling BSs, which provide an MBS according to the present invention. Particularly, FIG. 4 shows the flow of signals needed by an MBS controller to control schedulers of respective BSs within an MBS_ZONE according to the present invention.

Referring to FIG. 4, an MBS controller 430 transmits a media information request message to a contents server 450 (step 401) and receives a media information response message from the contents server 450 in response to the request (step 403). After receiving the media information response message from contents server 450, MBS controller 430 transmits an admission request message for requesting burst information to BSs 410 within the MBS_ZONE when it needs to transmit media, which are provided by contents server 450, to the BSs 410 (step 405). MBS controller 430 receives an admission response message from BSs 410 in response to the burst information request (step 409).

After receiving the admission response message from BSs 410, MBS controller 430 determines regions for actual MBS burst assignment by using the information received from BSs 410 within the MBS_ZONE. MBS controller 430 then transmits an MBS burst reservation request message to BSs 410. In response to the MBS burst reservation request message, BSs 410 transmit an MBS burst reservation response message to MBS controller 430 when reservation of MBS bursts is possible (step 411).

After successfully making reservations regarding all BSs (410) within the MBS_ZONE, MBS controller 430 transmits a media request message to contents server 450 in order to transmit media to BSs 410 (step 413). Contents server 450 transmits a media response message in response to the media request of MBS controller 430 (step 415). Contents server 450 transmits requested media to MBS controller 430 (step 417).

After receiving media from contents server 450, MBS controller 430 subjects the received media to traffic multiplexing and shaping and transmits MBS media to the BSs (step 419). The step for traffic multiplexing and shaping will be described later in more detail.

The procedure for transmitting signals among the BSs, the MBS controller, and the contents server so that the BSs can transmit media to the MS will now be described in more detail.

Referring to FIG. 4, MBS controller 430 according to the present invention manages the list of contents, which contents server 450 can provide, and information regarding the traffic characteristics of the contents by using a media information request message and a media information response message (steps 401 and 403). When MBS controller 430 needs to transmit streaming media to all BSs within the MBS_ZONE, e.g. BSs 410, it must check in advance if BSs 410 have regions for MBS burst assignment.

To this end, MBS controller 430 transmits an admission request message to BSs 410 so as to request information regarding bursts available to BSs 410 (step 405). In response to the admission request message, BSs 410 transmits MBS burst information to MBS controller 430 via an admission response message (step 407).

MBS controller 430 determines regions for actual MBS burst assignment by using information received from the BSs within the MBS_ZONE, e.g. BSs 410, and transmits information regarding the determination to BSs 410 via an MBS burst reservation request message (step 409). The information regarding the determination of assignment regions, which is included in the MBS burst reservation request message and transmitted to BSs 410 so as to reserve MBS bursts, includes a start frame, a frame period, a frame duration, a start symbol, an end symbol, a start sub-channel, and an end sub-channel.

In response to the received MBS burst reservation request message, BSs 410 transmit an MBS burst reservation response message to MBS controller 430 (step 411). BSs 410 add two flags: (1) a "success" flag to the MBS burst reservation response message if reservation regarding MBS bursts requested by MBS controller 430 is possible, and (2) a "failure" flag if the reservation has failed. Then, the MBS burst reservation response message is transmitted to MBS controller 430.

Particularly, when the reservation regarding MBS bursts has failed, MBS controller 430 newly determines MBS burst assignment regions and transmits another MBS burst reservation request message to all BSs 410 within the MBS_ZONE.

In contrast, when reservation regarding all BSs (410) within the MBS_ZONE is successful, MBS controller 430 transmits a media request message to contents server 450 in order to transmit a media stream to BSs 410 (step 413). In response to the media request message, contents server 450 transmits a media response message to MBS controller 430 (step 415). Then, a media stream is transmitted to MBS controller 430 (step 417).

MBS controller 430 subjects the media stream, which is transmitted by contents server 450, to traffic multiplexing and shaping so as to create an MBS media stream, which is transmitted to BSs 410 (step 419).

A traffic processing method by MBS controller 430, particularly a procedure for traffic multiplexing and shaping of the media stream from contents server 450 will now described in more detail.

Figure 5:
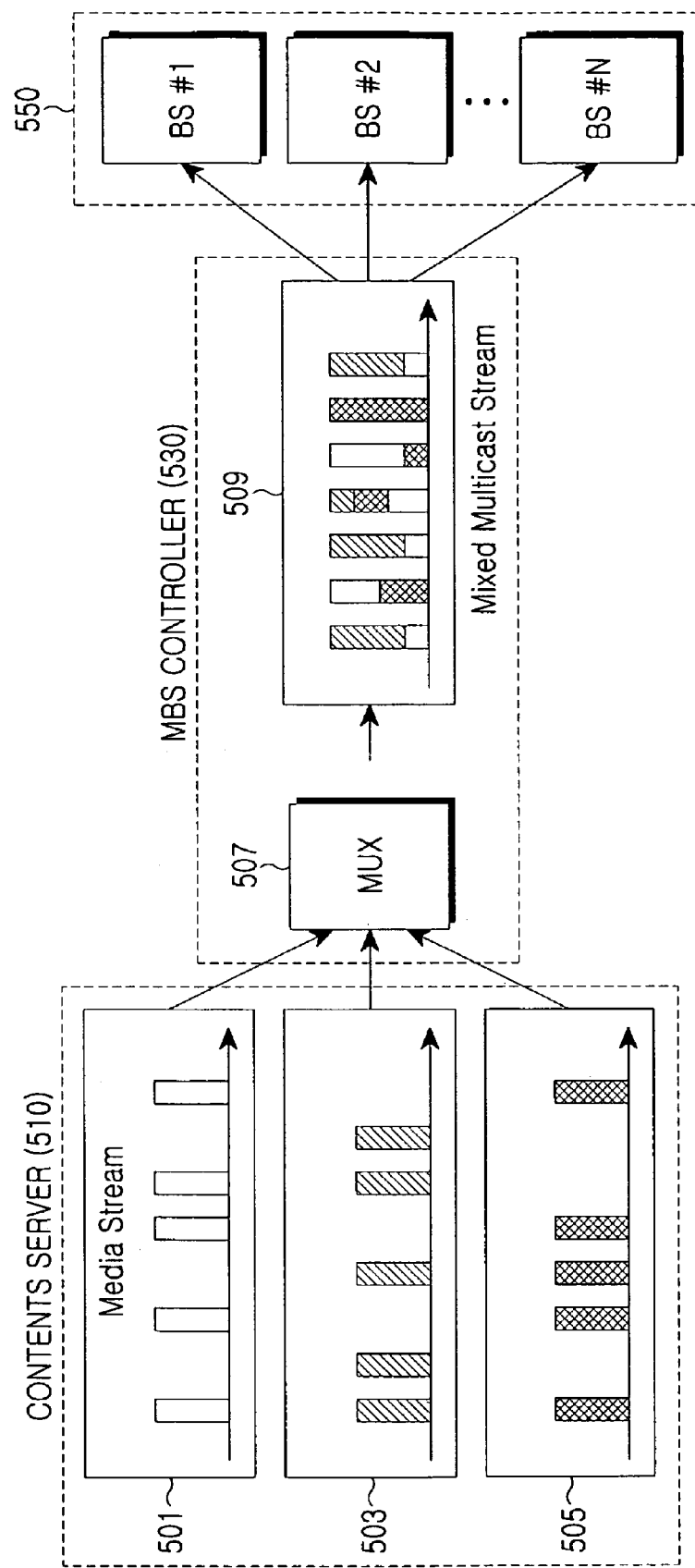
FIG. 5 shows steps for processing traffic in a BWA system according to the present invention.

It is clear from FIG. 5 that, although the media information transmitted by contents server 510 has various traffic characteristics, the traffic characteristics of a streaming media tend to have a VBR (Variable Bit Rate) pattern in many cases. In other words, the transmitted data does not have uniform period and size, but the period and size vary as in the case of media streams 501, 503, and 505 shown in FIG. 5.

However, such a media having a VBR pattern makes it very difficult for BSs 550 to determine the position and size of MBS bursts to be reserved, because the period and size of burst assignment are not uniform.

Therefore, according to the present invention, MBS controller 530 subjects the streaming media, which are transmitted by a number of contents servers 510, to multiplexing 507. The media are then subjected to shaping 509 so that they have a constant traffic pattern or a CBR (Constant Bit Rate). After undergoing the multiplexing and shaping, the streaming media are processed into mixed multicast streams, i.e. they have constant period and size as indicated by reference numeral 509 in FIG. 5.

Therefore, the section and period regarding assignment of MBS bursts, which must be reserved for the media stream in respective BSs 550, are clearly determined. A traffic processing method by the MBS controller will now be described with reference to FIG. 6.

Figure 6:
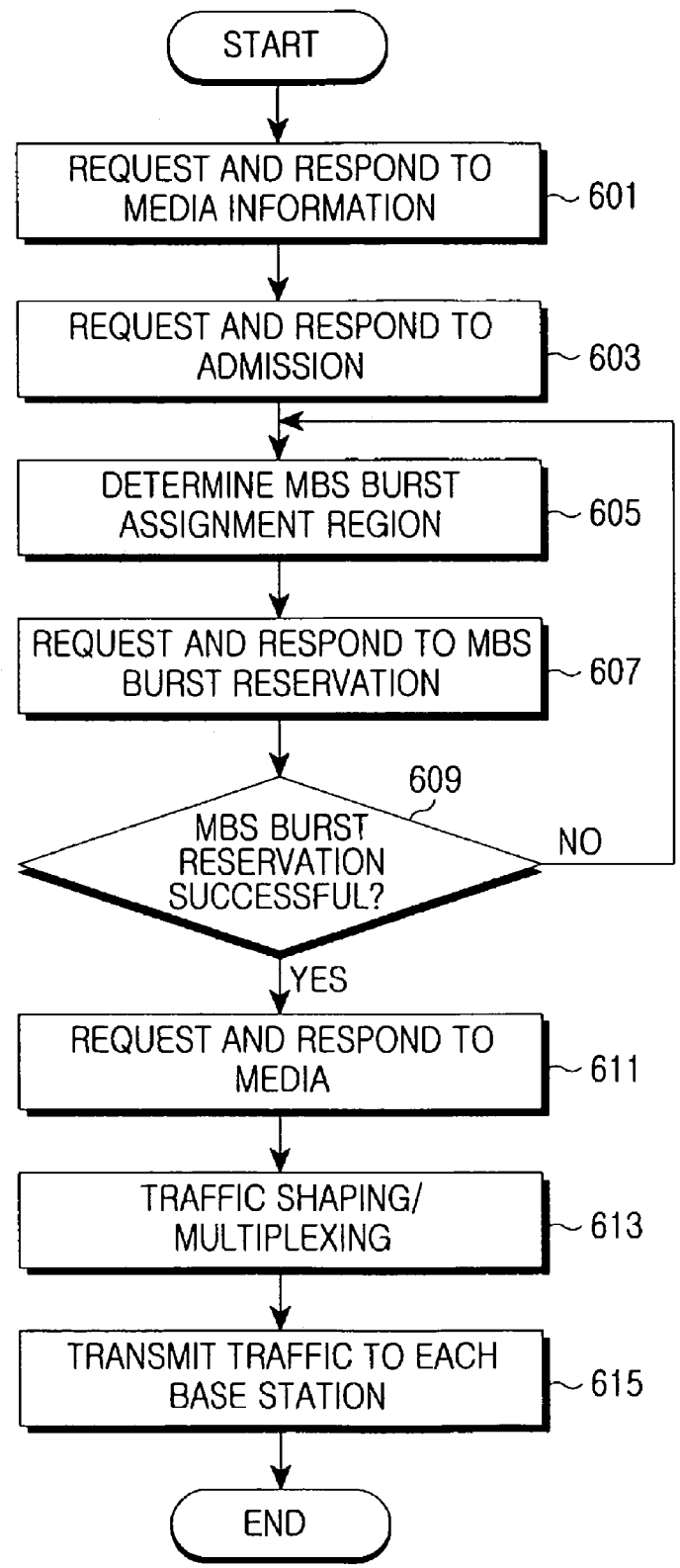
FIG. 6 is a flowchart showing a traffic processing method by an MBS controller according to the present invention.

As shown in FIG. 6, the method includes requesting/responding to media information with regard to a media server; requesting/responding to a check of an assignable region of a BS; determining an MBS burst assignment region; requesting/responding to an MBS burst reservation; requesting/responding to media; traffic multiplexing and shaping; and transmitting to the BS a media stream, which has undergone traffic processing.

Referring to FIG. 6, the MBS controller transmits a media information request message to a contents server in step 601. Upon receiving a response from the contents server, the MBS controller checks if the BS has an MBS burst assignable region in step 603. The MBS controller checks the MBS burst assignable region of the BS based on an admission request message and an admission request response message.

In step 605, the MBS controller collects information regarding bursts of the BS from the response message transmitted by the BS and determines an MBS burst assignment region based on the collected information. In step 607, the MBS controller transmits information regarding the determination to the BS via an MBS burst reservation request message. After receiving a response from the BS, the MBS controller decides if reservation of the MBS burst has succeeded or not in step 609.

If it is determined in step 609 that the reservation of the MBS burst has failed, the MBS controller proceeds to step 605, in which it newly determines an MBS burst assignment region and transmits another MBS burst reservation request message to the BS. If it is determined in step 609 that the reservation of the MBS burst is successful, the MBS controller proceeds to step 611 and transmits a media request message to the contents server.

After receiving a response to the request and corresponding media from the contents server, the MBS controller subjects the received media to traffic multiplexing and shaping in step 613. Finally, the MBS controller transmits traffic, which has undergone the multiplexing and shaping, to each BS in step 615.

According to the above-mentioned scheme for providing an MBS, after the MBS controller transmits IP packet-type data, which has undergone traffic processing, to all BSs within the MBS_ZONE, respective BSs create a MAC PDU (Packet Data Unit) based on the data and transmit it to the MS. However, the MAC PDU is affected by the condition of respective BSs or other traffic. In other words, the MAC PDU varies due to fragmentation or packing, which occurs when the MAC PDU is created.

In order to avoid this problem, the present invention provides that the MAC PDU is created by the MBS controller.

To this end, the MBS controller preferably incorporates the following functions, in addition to the above-mentioned functions.

Classification function and header compression function of CS (Convergence Sublayer) layer;

MAC PDU creation function of MAC layer;

The CS layer acts as a sublayer for junction between layers. Particularly, the CS layer classifies data transmitted by a superior layer, maps it onto a suitable connection, and compresses the data. Since the aid of the CS layer is indispensable to the creation of the MAC PDU, the MBS controller incorporates both the function of the CS layer and the function of MAC PDU creation.

As such, the MBS controller according to the present invention incorporates the above-mentioned functions so that, after processing traffic, the MBS controller creates a MAC PDU based on the traffic and transmits the MAC PDU to BSs within the MBS_ZONE. After receiving the MAC PDU, the BSs can transmit them to the MS through modulation and encoding without a separate process for creating the MAC PDU.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A traffic processing method for supporting a Multicast/Broadcast Service (MBS) in a broadband wireless access communication system having a number of base stations and at least one contents server for transmitting various streams of media traffic to the base stations, the method comprising the steps of:
   a) reserving a resource for MBS burst assignment with regard to the base stations in order to equalize synchronization of the base stations;
   b) requesting the contents server to provide at least one stream of media traffic to be transmitted to the base stations when the resource has been successfully reserved;
   c) shaping the at least one stream of media traffic transmitted by the contents server into an MBS media stream having a constant traffic pattern; and
   d) transmitting the MBS media stream to the base stations.

2. The traffic processing method as claimed in claim 1, wherein, when there are at least two streams of media traffic in step c), the at least two streams of media traffic are subjected to multiplexing.

3. The traffic processing method as claimed in claim 1, further comprising managing a list of streams of media traffic, the contents server being able to provide the streams of media traffic, and information regarding characteristics of the streams of media traffic.

4. The traffic processing method as claimed in claim 1, wherein step a) comprises:
   requesting the base stations to provide information regarding an available MBS burst and receiving a corresponding response from the base stations;
   determining an assignment region of an MBS burst in accordance with the response from the base stations; and
   transmitting information regarding determination of the assignment region to the base stations and reserving a resource for MBS burst assignment.

5. The traffic processing method as claimed in claim 1, further comprising determining a new MBS burst assignment region and reserving a resource with regard to the base stations again when resource reservation for MBS burst assignment has failed.

6. The traffic processing method as claimed in claim 2, wherein, in step c), the at least two streams of media traffic of a variable bit rate type transmitted by the contents server are shaped into a constant bit rate type having the constant traffic pattern.

7. The traffic processing method as claimed in claim 2, wherein, in step c), the at least two streams of media traffic are shaped into a constant period and a uniform size.

8. A method for supporting a Multicast/Broadcast Service (MBS) in a broadband wireless access communication system having a mobile station, a contents server for providing various types of media information, a number of base stations, and a controller for transmitting the media information to the base stations, the method comprising:
   a) reserving a resource for MBS burst assignment with regard to all base stations positioned in an identical MBS zone by the controller;
   b) transmitting information regarding possibility of assignment to the controller in response to a request for MBS burst assignment by the base stations positioned in the identical MBS zone, the information having been designated by a flag;

c) requesting the contents server to provide media to be transmitted to the base stations by the controller when MBS burst assignment is possible;

d) receiving a media stream from the contents server in response to a request of the media, shaping the media stream, and transmitting the media stream to the base stations in the identical MBS zone;

e) transmitting the media stream to the mobile station by the base stations, the media stream having been shaped; and f) receiving the media stream transmitted to the base stations in the identical MBS zone, combining each received media stream, and providing a user with the media stream.

9. The method as claimed in claim 8, further comprising shaping and multiplexing media streams when at least two media streams have been received.

10. The method as claimed in claim 8, further comprising managing a list of media, the contents server being able to provide the media, and information regarding characteristics of the media.

11. The method as claimed in claim 8, wherein step a) comprises:
requesting the base stations to provide information regarding an available burst and receiving a corresponding response from the base stations;
determining an assignment region of an MBS burst in accordance with the response from the base stations; and
transmitting information regarding determination of the assignment region to the base stations and reserving a resource for MBS burst assignment.

12. The method as claimed in claim 8, further comprising determining a new MBS burst assignment region and reserving a resource with regard to the base stations again when resource reservation for MBS burst assignment has failed.

13. The method as claimed in claim 8, wherein, in step d), a traffic of a variable bit rate type transmitted by the contents server is converted into a traffic of a constant bit rate type having a constant traffic pattern.

14. The method as claimed in claim 8, wherein, in step d), the media stream is converted into a media stream having a constant period and a uniform size.

15. A traffic processing apparatus for supporting a Multicast/Broadcast Service (MBS) in a broadband wireless access communication system having at least one contents server for transmitting various streams of media traffic, the apparatus comprising:
an MBS controller for reserving a resource for MBS burst assignment with regard to the base stations in order to equalize synchronization of the base stations, requesting the contents server to provide at least one stream of media traffic to be transmitted when the resource has been successfully reserved, shaping the at least one stream of media traffic provided by the contents server into an MBS media stream having a constant traffic pattern, and providing the MBS media stream to the base stations.

16. The traffic processing apparatus as claimed in claim 15, wherein the MBS controller is adapted to multiplex streams of media traffic when at least two streams of media traffic are transmitted by the contents server.

17. The traffic processing apparatus as claimed in claim 15, wherein the MBS controller is adapted to manage a list of streams of media traffic, the contents server being able to provide the streams of media traffic, and information regarding characteristics of the streams of media traffic.

18. The traffic processing apparatus as claimed in claim 15, wherein the MBS controller is adapted to determine an assignment region for an MBS burst and reserve a resource for the MBS burst assignment in accordance with information regarding determination of the assignment region.

19. The traffic processing apparatus as claimed in claim 15, wherein the MBS controller is adapted to determine a new MBS burst assignment region and reserve a resource for MBS burst assignment again in accordance with information regarding determination of the new MBS burst assignment region when resource reservation for MBS burst assignment has failed.

20. The traffic processing apparatus as claimed in claim 15, wherein the MBS controller is adapted to shape the at least two streams of media traffic of a variable bit rate type transmitted by the contents server into a constant bit rate type having a constant traffic pattern.

21. The traffic processing apparatus as claimed in claim 15, wherein the MBS controller is adapted to shape the at least two streams of media traffic into a constant period and a uniform size.

22. A system for supporting a Multicast/Broadcast Service (MBS) in a broadband wireless access communication system having a number of base stations and at least one contents server for transmitting various media streams to the base stations, the system comprising:
an MBS controller for reserving a resource for MBS burst assignment with regard to the base stations, requesting the contents server to provide media to be transmitted to the base stations, receiving a corresponding media stream, converting the media stream into an MBS media stream through shaping processing, and transmitting the MBS media stream to the base stations;
a number of base stations for providing burst information requested by the MBS controller, notifying possibility of resource assignment for MBS burst assignment in response to a request of the MBS controller by means of a flag setup, and transmitting the MBS media stream to a mobile station; and
a mobile station for receiving MBS media data from the base stations, combining the MBS media data, and providing a user with the MBS media data.

23. The system as claimed in claim 22, wherein the MBS controller is adapted to multiplex the media streams when there are at least two media streams.

24. The system as claimed in claim 22, wherein the MBS controller is adapted to manage a list of media, the contents server being able to provide the media, and information regarding characteristics of the media.

25. The system as claimed in claim 22, wherein the MBS controller is adapted to request the base stations to provide information regarding an available burst, determine an assignment region of an MBS burst in accordance with information received from the base stations, transmit information regarding determination of the assignment region to the base stations, and reserve a resource for MBS burst assignment.

26. The system as claimed in claim 22, wherein the MBS controller is adapted to determine a new MBS burst assignment region and reserve a resource for MBS burst assignment with regard to the base stations again when resource reservation for MBS burst assignment has failed.

27. The system as claimed in claim 22, wherein the MBS controller is adapted to convert a media stream of a variable bit rate type transmitted by the contents server into a media stream of a constant bit rate type having a constant media stream pattern.

28. The system as claimed in claim 22, wherein the MBS controller is adapted to convert the media stream into a media stream having a constant period and a uniform size.

29. The system as claimed in claim 22, wherein the base stations are positioned in an identical MBS zone.

* * * * *